No. 849,318. PATENTED APR. 2, 1907.
V. W. BLANCHARD.
COOKING APPARATUS.
APPLICATION FILED JAN. 22, 1906.
2 SHEETS—SHEET 1.
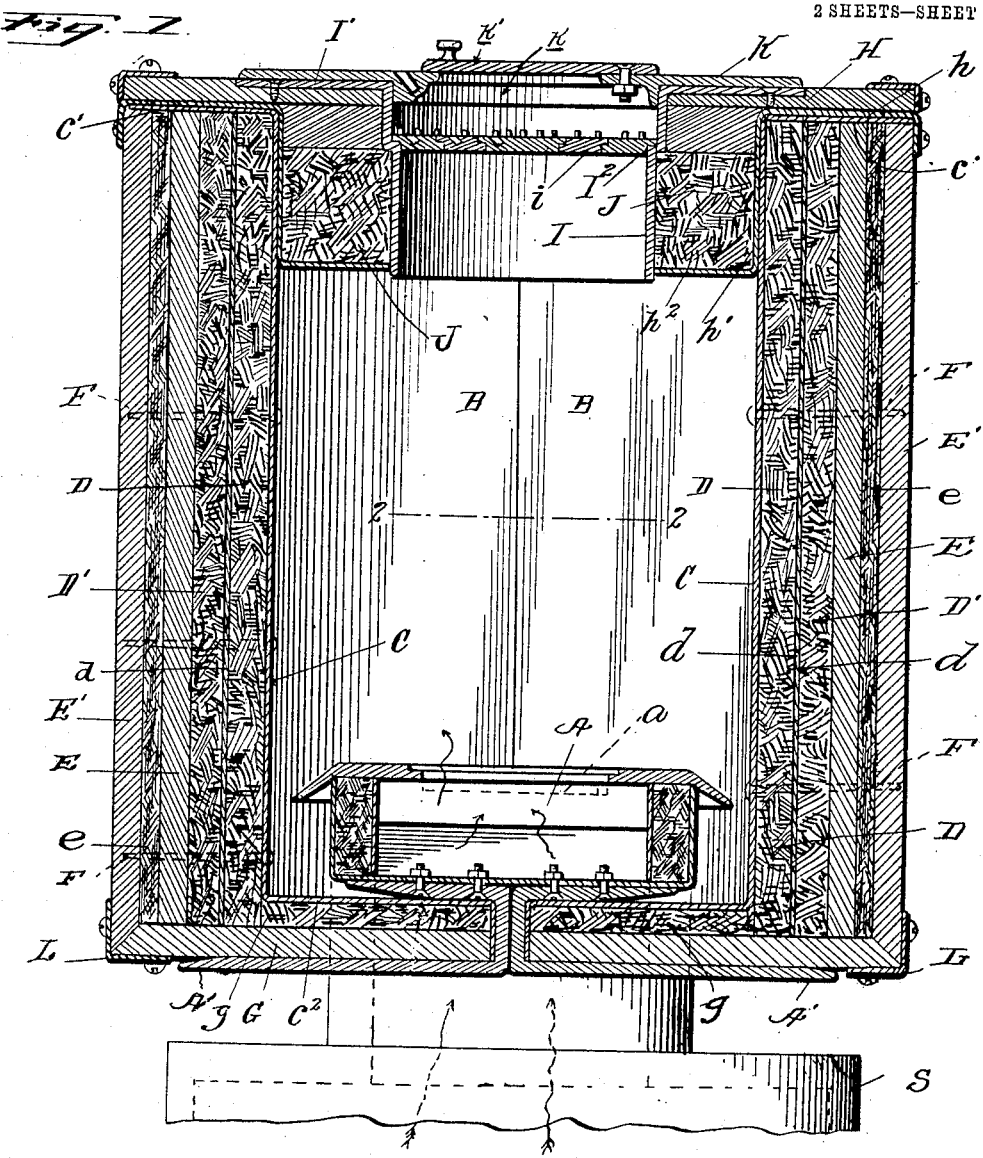
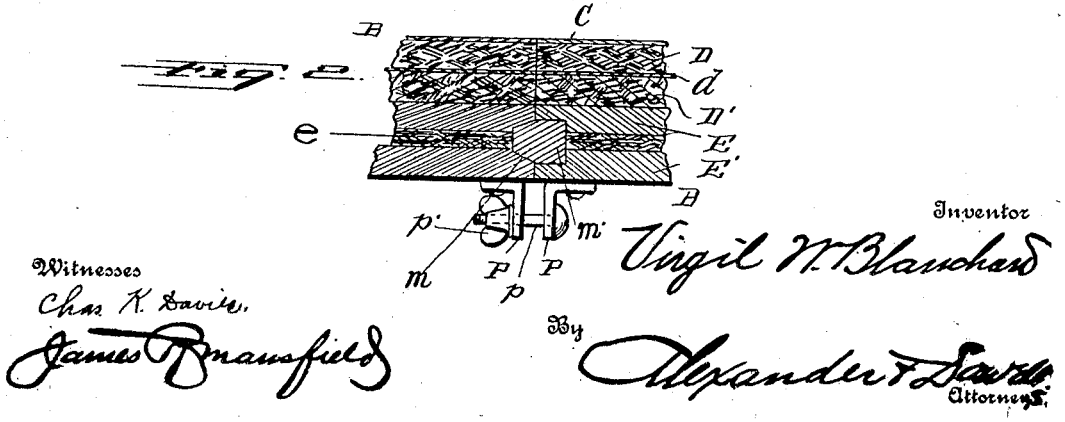
Witnesses
Chas. K. Davis.
James B. Mansfield
Inventor
Virgil W. Blanchard
By Alexander F. Davis
Attorneys

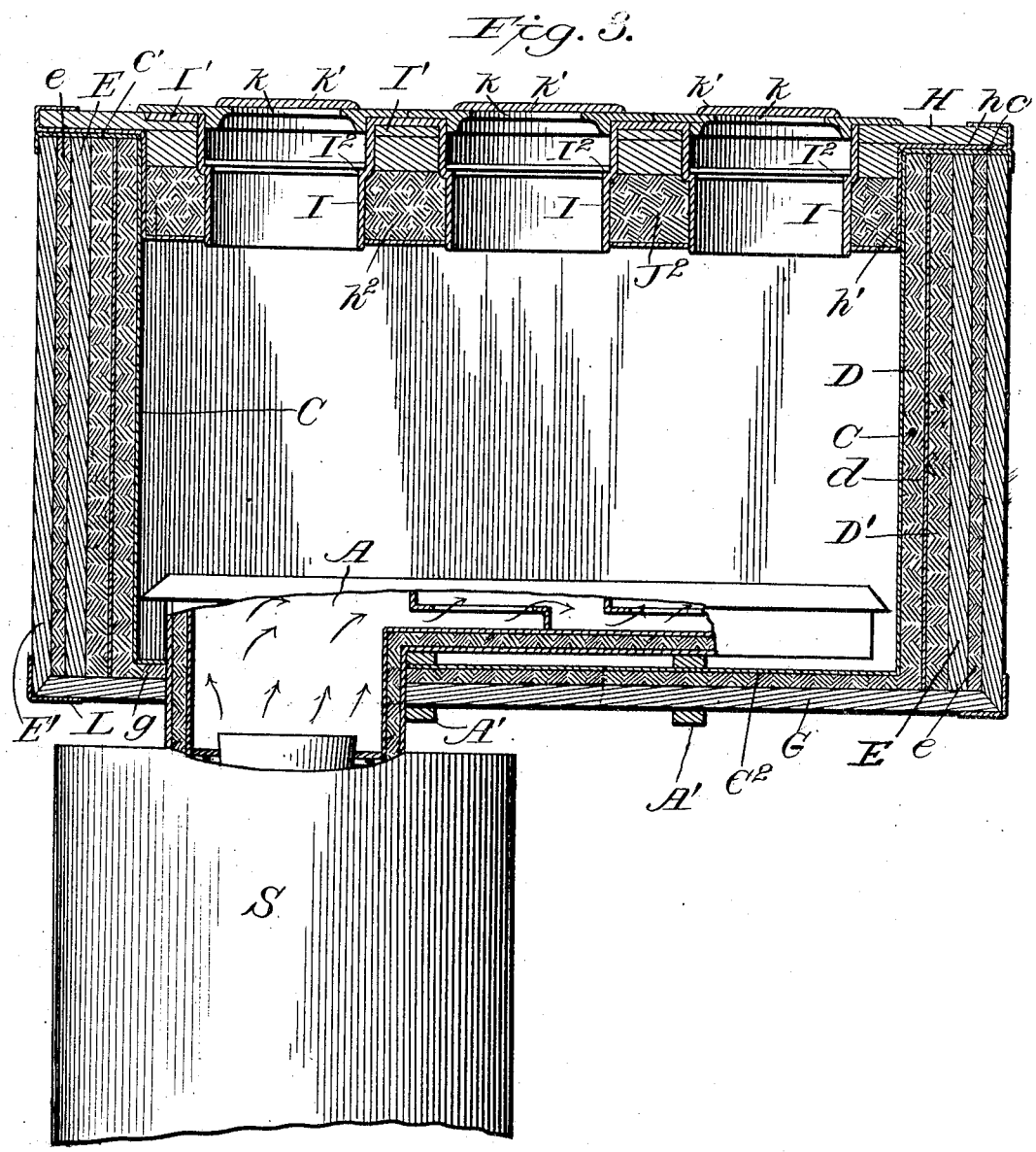

UNITED STATES PATENT OFFICE.

VIRGIL W. BLANCHARD, OF NEW YORK, N. Y.

COOKING APPARATUS.

No. 849,318.     Specification of Letters Patent.     Patented April 2, 1907.

Application filed January 22, 1906. Serial No. 297,253.

*To all whom it may concern:*

Be it known that I, VIRGIL W. BLANCHARD, of New York, in the county of New York and State of New York, have invented certain new and useful Improvements in Cooking Apparatus; and I hereby declare that the following is a full, clear, and exact description thereof, reference being had to the accompanying drawings, which form part of this specification.

This invention is an improvement in cooking apparatus; and its object is to provide a novel heat storing or accumulating chamber adapted to be attached to gas heating-stoves, but also adapted to store heat supplied thereto from any source.

The present invention has particular reference to the construction of the heat-accumulating chamber as applied to a gas heating-range; but when once explained it can be adapted by those acquainted therewith to other similar styles of heaters, and while I will show the same as adapted to be used with the said range. I do not limit myself in the broader claims to the particular form shown and described in the drawings, nor to the use of the invention in connection with said range.

In the drawings, Figure 1 is a vertical transverse section through one form of heat accumulating or storing chamber embodying the invention and showing it as applied to a gas heating stove or range; and Fig. 2 is a detail horizontal section on line 2 2 of Fig. 1, indicating a joint between the opposite halves of the casing. Fig. 3 is a sectional view showing the connection of the chamber and the range portion of the stove.

In said drawings, A designates a section of the range extension of a gas-burning apparatus of any suitable construction, through which extension the heated products of combustion travel horizontally. The range A is connected to the outlet of a stove or heater, (indicated at S in the drawings;) but I have not deemed it necesssary to show the construction of such stove in the drawings. The said section can be connected to a heater of any desired construction adapted to supply large quantities of heated gases to the flue. The upper side of this flue or section A is provided with an opening *a*, adapted to be closed by removable covers or plates, and to its under side are connected oppositely-extended horizontally-disposed U-shaped brackets A', which form the supports for the removable heat-accumulating chamber, which is the particular subject of the present invention. Said chamber, as shown, is rectangular in cross-section and is preferably made in opposite halves B B, although it may be made in one piece. As shown in the drawings, it is made in halves for the purpose of facilitating its application to or removal from the stove. The feature of having the chamber made in sections is not a particular subject of the present application. The vertical walls of this casing or chamber have an interlining C, of sheet metal, preferably of tin, which is extended over the upper edges of the side walls, as shown at $c'$, and is also extended over the inner bottom surface of the casing, as shown at $c^2$. Outside of this wall C is a thick layer D of non-heat-conducting material, preferably asbestos. Outside of this is another layer $d$ of sheet metal, which may be sheet-iron, outside of which is another layer D' of asbestos, the layers D and D' being quite thick. Outside of the layer D' is a sheathing E, of wood, which is surrounded by a layer of non-heat-conducting material $e$, preferably felt, outside of which is a final casing or jacket E', which is preferably of wood. The aforesaid several layers of material constitute the vertical walls of the chamber and may be securely bound together in any suitable manner, being shown as secured together by wooden screws F in the drawings. The vertical walls of the chamber rest upon the base-plate G, of wood, between which and the innermost layer $c^2$ of metal is a thick layer of asbestos or other non-heat-conducting material $g$.

The upper end of the chamber is preferably closed by a cover comprising a wooden plate H, having a lining $h$ of metal provided with a thick depending portion adapted to closely fit in the upper end of the casing or opening therein after the manner of a tightly-fitting cap or stopper, the cover having an opening or openings. In each opening in the cover is fitted a metallic collar I, having a lateral flange I' on its upper end projecting over the top of the wood layer H, so as to support the collar I in position thereon, and around this collar and filling the space between it and the metallic outer plate $h'$ and bottom plate $h^2$ is a thick filling of non-heat-conducting material J, preferably asbestos, the whole being so constructed that the chamber will be closed practically air-tight and will be so thick-walled that heat cannot escape therefrom by radiation or conduction, although the inner walls and entire mass of the casing and cover become highly heated and will retain that heat a very long time; but it cannot escape therefrom by radiation or conduction, and there will be practically no radiation of heat therethrough exteriorly, although heat will be radiated into the interior of the apparatus from the metallic plates C and $h^2$.

The collar I is provided with an annular shoulder $I^2$, on which is supported a griddle or nest of plates $i$, by removing one of which a vessel of desired size can be placed thereon to be heated. Above the griddle $i$ the collar is closed by a removable metallic cover K, which has a central aperture $k$, closed by a valve or door $k'$, which valve can be opened when it is desired to place some article or utensil upon the griddle $i$, and then closed to prevent the loss of heat by radiation or the outflow of hot gases from the heat-chamber.

The corners of the casing may be strengthened or protected by angle-irons L, as shown in the drawings. If made in sections, as indicated in the drawings, the meeting edges of the sections may be provided, respectively, with a rabbet $m$ and a projecting rib $m'$, preferably of non-combustible fiber or other suitable gasket material adapted to make close joint when the sections are fitted together.

The sections B B can be fastened together in any desired manner. As shown in Fig. 2, they are provided on their meeting edges with lugs P P, connected by a bolt $p$, fastened by a nut $p'$.

In the operation of this device it is applied to or connected with a suitable heat-generator, such as a gas-stove, for example, and the drawings illustrate it as connected with the outlet of a gas heating-range S, and after the chamber has been applied thereto and suitably closed the cover of opening $a$ may be removed by first opening the valve $k'$ and removing one of the plates $i$, and then, after the hot gases drive out the cold air, the plate $i$ is replaced and the valve or cover $k'$ partly closed, so that the heated gases entering said chamber are detained therein, and owing to the thickness of the walls and the amount of metal on the inner surface thereof and the non-heat-conducting layers a great amount of heat is stored up or accumulated in the walls of said chamber before any heat is noticeable on the outside thereof. In fact, it is practically impossible by applying heat interiorly up to 700° Fahrenheit to 800° Fahrenheit to raise the temperature of the outside casing to any very perceptible degree. When the chamber is thoroughly heated, the gas-supply may be cut off and the inlet therefrom to the chamber may be entirely closed.

Owing to the great amount of heat stored in the walls of the chamber, it is well adapted for cooking and heating articles which may be placed therein by removing the plates $i$ and opening the valve $k'$, said plates being replaced and the valve closed after the articles are in the oven, and the articles can be thoroughly cooked by the stored heat, and a large amount of food can be cooked before the apparatus becomes cool.

By means of this invention a small amount of fuel consumed in the burner will generate a great quantity of heat, all or most of which is conserved in the storage-chamber without being permitted to waste into the atmosphere, and by thus storing the heat units a great deal more service and work can be accomplished with a smaller amount of fuel than can be accomplished in the open ranges or furnaces where an excessive expenditure of fuel is required, owing to the great waste of heat in the escaping gases.

If desired, a small quantity of gas may be continuously supplied to the interior of the chamber through the flue, keeping the same continuously full of carbonic-acid gas, whereby the oxidation and burning of aliments placed in the chamber are prevented and the articles of food will be cooked in a more hygienic manner.

Having thus described my invention, what I therefore claim as new, and desire to secure by Letters Patent thereon, is—

1. The herein-described heat-accumulating chamber having its walls constructed with an internal layer of metal, a layer of asbestos, a second metal lining, a second layer of asbestos, a layer of wood, and a layer of felt, and an outer layer of wood.

2. The combination of a gas-supply flue, U-shaped supports attached to the under side of said flue, and a heat-accumulating chamber surrounding said flue and mounted on said supports, said chamber having its walls constructed to prevent loss of heat by exterior conduction or radiation.

3. The combination with a heat-accumulating chamber having an outlet in its top, of a closure for said outlet, comprising a wood plate having a lining of metal and an opening, an annular metallic collar fitted in said opening, an asbestos packing surrounding said collar, a griddle supported on said collar, a plate for closing the opening in said collar, having an aperture and a valve for said aperture.

In testimony that I claim the foregoing as my own I affix my signature in presence of two witnesses.

VIRGIL W. BLANCHARD.

In presence of—
JAMES R. MANSFIELD,
L. E. WITHAM.